(12) United States Patent
Chang

(10) Patent No.: US 6,404,529 B1
(45) Date of Patent: Jun. 11, 2002

(54) DUAL OPTICAL MODULE SCANNING MECHANISM

(75) Inventor: Tony Chang, Hsinchu (TW)

(73) Assignee: Avision Inc., Hsinchu (TW)

( * ) Notice: Subject to any disclaimer, the term of this patent is extended or adjusted under 35 U.S.C. 154(b) by 4 days.

(21) Appl. No.: 09/634,335

(22) Filed: Aug. 7, 2000

(30) Foreign Application Priority Data

Aug. 18, 1999 (TW) .......................... 88114219 A

(51) Int. Cl.[7] .............................. G02B 26/08
(52) U.S. Cl. .................. 359/196; 359/198; 359/201; 358/474; 358/497
(58) Field of Search ................ 359/196, 201, 359/202, 212, 198; 358/474–475, 494, 496, 497

(56) References Cited

U.S. PATENT DOCUMENTS 5,831,749 A * 11/1998 Tseng .......................... 358/474

* cited by examiner

Primary Examiner—James Phan
(74) Attorney, Agent, or Firm—Winston Hsu

(57) ABSTRACT

Two optical modules with reflecting mirrors provide two moving speeds so as to maintain a constant light path distance between a document and an image sensor. The slower optical has two driving wheels mounted thereon. The larger driving wheel rubs against a stretched belt to move the faster module in one direction. The faster module pulls the slower module, but at a reduced speed by means of a second belt that spans the linkage between the two modules. When the two driving wheels rotate in the same direction, the slower optical module moves half as fast as the faster optical module. The path of a scanning light ray between the light source and the light sensor thus maintains a constant distance wherever the scanning light moves.

11 Claims, 3 Drawing Sheets

DUAL OPTICAL MODULE SCANNING MECHANISM

BACKGROUND OF THE INVENTION

1. Field of the Invention

The present invention relates to a mechanism for an optical system, and in particular to an optical system in a scanner.

2. Description of the Prior Art

In a typical scanner, two moving optical modules with mounted reflecting mirrors are used. A scanning light source is placed in one module A scanning light ray is reflected by a mirror in the second module to a light sensor that is fixed on the frame of the scanner Both modules move along a same track. It is desirable to maintain a fixed optical path length between the light source and the light sensors This can be accomplished by moving both modules together, but with different speeds. A speed ratio of 1:2 is often chosen. The difference in speed is obtained by choosing different diameters of rollers that drive a conveying belt for the two optical modules.

In a traditional scanner, the motor for driving the optical modules is mounted on the frame of the scanner. When this driving motor operates, the motion of the driving motor may cause vibration of the frame of the scanner and create a great deal of noise. Such a noise is undesirable.

It is also desirable to miniaturize the size of a scanner.

SUMMARY OF THE INVENTION

It is an objective of this invention to reduce noise of the dual speed modules. Another objective of this invention is to reduce the thickness and hence the size of a scanner with dual speed modules.

These objectives are achieved by mounting a driving motor on one of the modules Since the motor is not directly mounted on the frame, the frame does not vibrate as violently, and the noise is reduced. In addition, by not mounting the motor on the frame, no space is required for the motor in vertical or horizontal directions. Thus, the frame of the scanner can be made thinner or narrower, and hence smaller.

Two moving optical modules are used A scanning light beam is emitted from a first module and directed toward a second optical module, which is pulled by the first optical module. The light beam in reflected by a mirror in the second optical module toward a light sensor placed on the other side of the first optical module. As a scanning light in the first optical module moves toward the light sensor, the separation between the first optical module and the second optical module is made, to increase such that the second optical module moves by one half the distance of the first optical module. In so doing, a light path traversed by the scanning light beam is maintained constant as the scanning light source scans. This mechanism is implemented by using two sets of belts moving at two different speeds: a first belt pulling the first optical module at a higher speed, and a second belt separating the two modules at a slower speed.

The second optical module is pulled by the second belt by a second driving wheel toward the first optical module by means of the second belt looping from the first optical module through the second driving wheel to a point at the right side wall of the frame. When the second driving wheel rotates in the same clockwise direction as a first driving wheel, the second optical module is pulled by the first optical module, but at a reduced speed due to lengthening of the separation between the first optical module and the second optical module, which tends to move toward the left side but is overcome by a right side pull from the first optical module. The net pull results in a reduced rightward speed of the second optical module.

DETAILED DESCRIPTION OF THE INVENTION

In a dual-module optical system for a scanner, there exists a higher speed module and a slower speed module. The typical speed ratio of the higher speed module to the slower speed module is 2:1. The reason for the dual speeds is to maintain a fixed distance between the image and the image sensor while scanning.

Figure 1:
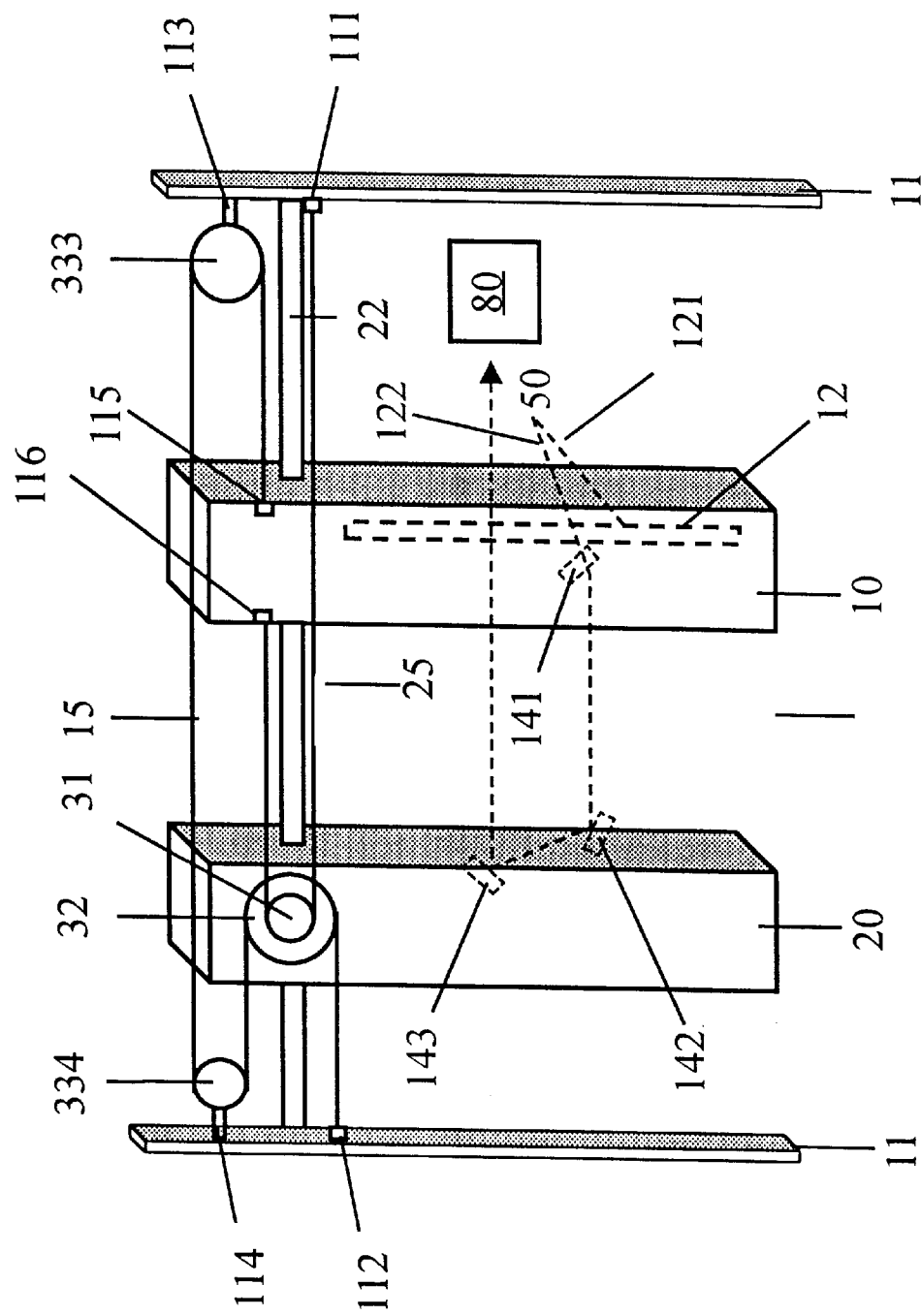
FIG. 1 shows the different components of the present invention, including two moving optical modules.

FIG. 1 shows a bottom view of the present invention, looking upward from the bottom of a scanner. A document 50 is placed on an opposite side. Two moving modules 10 and 20 are used for scanning, with the higher speed module 10 on the right hand side and the slower speed module 20 on the left-hand side Both modules 10 and 20 ride on a guide rail 22. The higher speed module 10 has a light source 12, which emits a light ray 121 to scan the document 50, and which is reflected by a mirror 141 toward the slower speed module 20. The slower speed module 20 has a second reflecting mirror 142 and a third reflecting mirror 143 for reflecting the light ray 122 to an image sensor 80. The image sensor 80 is mounted on the bottom of the frame 11 to the right of the higher speed module 10. The typical speed ratio of the higher speed module 10 to the slower speed nodule 20 is 2:1.

The slower speed module 20 has a first driving wheel 32 capable of driving a belt 15. The belt 15 is fixed at one end 112 to the left side wall of the frame 11, wraps around the first driving wheel 32, snakes through a first idler 334 pivoted to the left side wall of the frame 11 and through a second idler 333 pivoted to the right side wall of the frame 11, and ends at a point 11,5 on the right side of the higher speed module 10. When the first driving wheel 32 turns in clockwise direction, the belt 15 pulls the higher speed module 10 towards the right.

A second driving wheel 31 drives a belt 25, which wraps around the second driving wheel 31 with one half the diameter of that of the first driving wheel 32. One end of the belt 25 is fixed at point 111 on the right wide wall of the frame 11. The other end of the belt 25 is connected to a left side point 116 of the higher speed module 10. As the higher speed module 10 is driven toward the right side by the pull of the belt 15, the belt 25, which wraps around the second driving wheel 31, pulls slower speed module 20 toward the higher speed module 10. However, due to the clockwise rotation of the wheel 31, a section of the belt 25, which links the higher speed module 10 and slower speed module 20, slackens and increases in length as the two modules 10 and 20 move in the right-hand direction. The module 20 thus moves at slower speed than the module 10.

Figure 2:
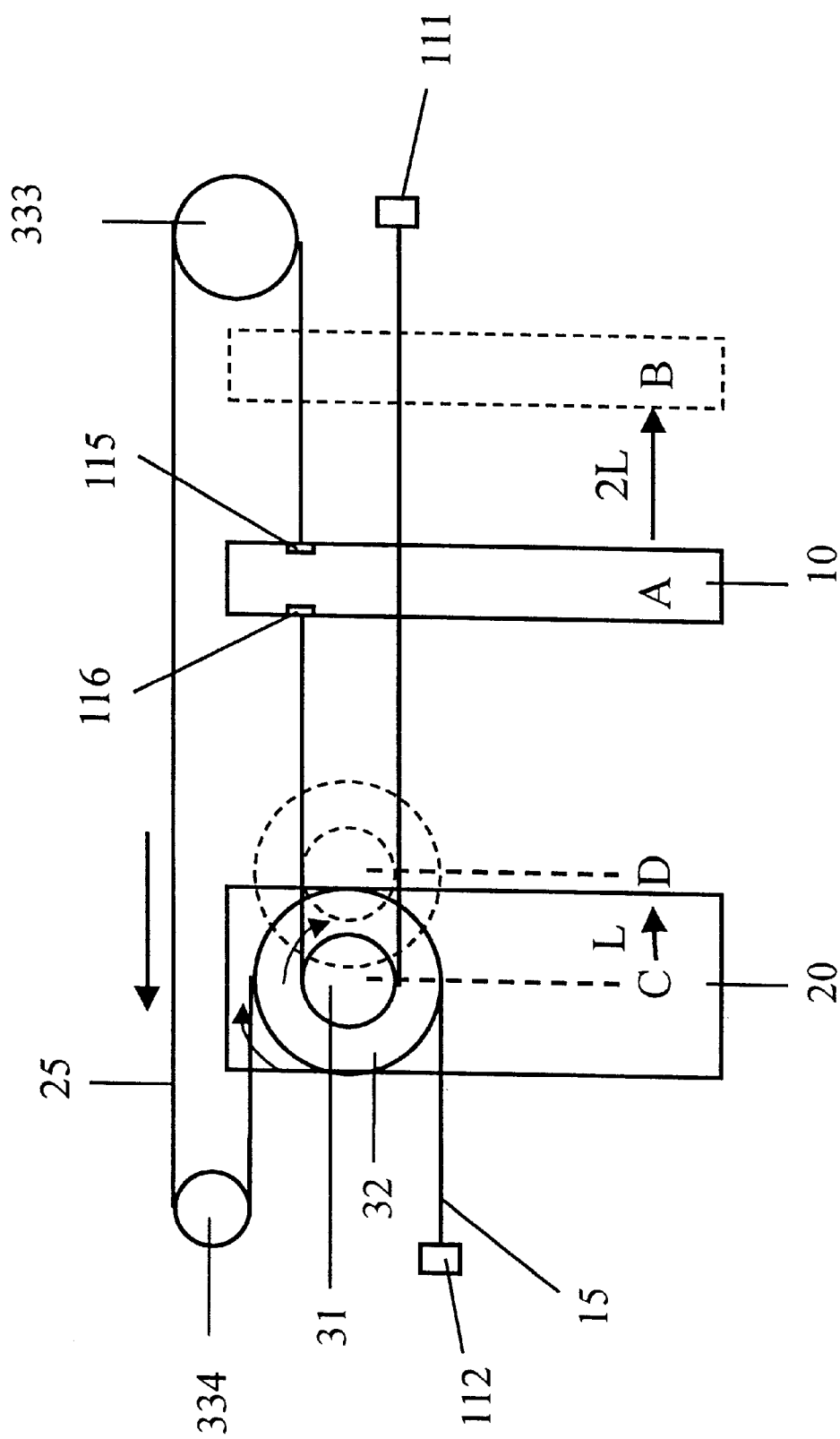
FIG. 2 shows operation of a driven wheel that is placed on the slower module.

The movement of the modules 10 and 20 shown in FIG. 1 is illustrated in FIG. 2 for the case where the first driving wheel 32 has twice the diameter of the smaller second driving wheel 31. As the higher speed module 10 moves from position A to (dotted) position B by a distance of 2L, the slower speed module 20 moves from position C to (dotted) position D by half, a distance of L. Thus the scanning light beam emitted from the module 10 and reflected from module 20 maintains the same distance when reaching the light sensor 80, whether the module 10 is in position A or B.

In FIG. 1 and FIG. 2, the motor (not shown) for the concentric wheels 31 and 32 is placed inside the slower module 20. The placement of the motor in the moving module 20 instead of on the frame 11 can save space and reduce noise.

Figure 3:
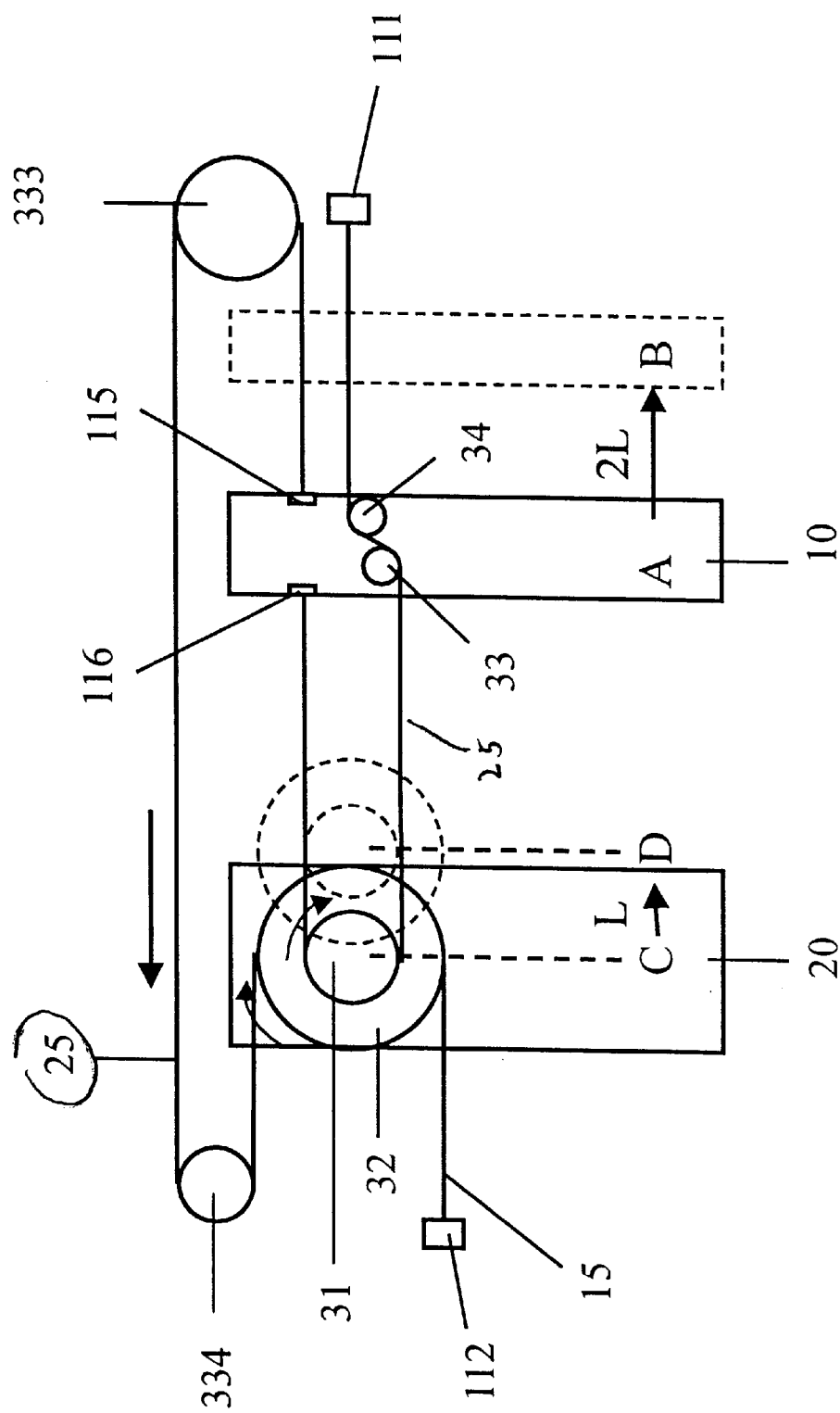
FIG. 3 shows operation of a driven wheel placed on the faster module.

FIG. 3 shows another embodiment of the present invention. The mechanism shown in FIG. 3 is similar; to that of FIG. 1 and FIG. 2, except that the motor (not shown) is placed inside the higher speed module 10. The motor drives a wheel 33, which rubs against the belt 25. The belt 25 wraps around the smaller second wheel 31 on the slower speed module 20 as in FIG. 1 and FIG. 2. As the driving wheel 33 rotates in the clockwise direction, the second wheel 31 follows to rotate in a clockwise direction. An idler 34, which is offset from the driving wheel 33, is mounted on the higher speed module 10, so that the belt 25 has more wrapping and rubbing surface against the driving wheel 33. Otherwise, the operation is the same as the mechanism shown in FIG. 1 and FIG. 2. As shown in FIG. 3, when the driving wheel 33 rotates in the clockwise direction, both the smaller second wheel 31 and the larger first wheel 32 follow to rotate in a clockwise direction. The belt 15 moves the higher speed module 10 from position A to the (dotted) position B, say by a distance of 2L. Meanwhile, module 20 is pulled by the belt 25 from position C to (dotted) position D at a reduced speed by half the distance, a distance L. In so doing, a scanning light ray emitted from the higher speed module 10 travels the same distance in reaching the light sensor, in either position A or S of the higher speed module 10. Mounting the motor in the moving module 10 also reduces noise and saves space.

While belts are used as conveyers of the modules 10 and 20 in the foregoing descriptions, it should be pointed out the conveyers are not limited to belts. Belts and wheels with teeth, rollers and steel wires, wheels and nylon threads, etc may also be used as conveyers.

While particular embodiments of the invention have been described, it will be apparent to those skilled in the art that various modifications may be made in the embodiments without departing from the spirit of the present invention. Such modifications are all within the scope of this invention.

What is claimed is:

1. A driving mechanism for a scanning optical system, the driving mechanism housed in a frame having a left side and a right side, the driving mechanism comprising:
   a higher speed optical module movably disposed within the frame;
   a slower speed optical module movably disposed within the frame;
   a guide along which the higher speed optical module and the slower speed optical module ride;
   a first driving wheel mounted on the slower speed optical module;
   a second driving wheel mounted on the slower speed optical module;
   a motor mounted on the slower speed optical module for driving the first driving wheel and the second driving wheel;
   a first idler mounted on the left side of the frame;
   a second idler mounted on the right side of the frame;
   a first conveyer connected to the right side of the frame and to the higher speed optical module, the first conveyer mechanically engaging the second driving wheel; and
   a second conveyer connected to the left side of the frame and to the higher speed optical module, the second mechanically engaging the first driving wheel, the first idler and the second idler;
   wherein when the motor drives the first driving wheel and the second driving wheel, the first conveyer and the second conveyer cause the higher speed optical module to move at a speed that is effectively twice that of the slower speed optical module.

2. The driving mechanism of claim 1, wherein the first conveyer and the second conveyer are selected from a group consisting of a belt engaging a driving wheel, a toothed belt engaging a toothed driving wheel, a steel wire engaging a driving wheel, and a nylon thread engaging a driving wheel.

3. The driving mechanism of claim 1 wherein the first driving wheel has a diameter with respect to the second conveyer that is twice as large as a diameter of the second driving wheel with respect to the first conveyer.

4. The driving mechanism of claim 3 wherein the first driving wheel is concentric with the second driving wheel.

5. The driving mechanism of claim 1 further comprising:
   a light source disposed in the higher speed optical module;
   a first mirror disposed in the higher speed optical module for reflecting light from the light source to a document; and
   a second mirror in the slower speed optical module for reflecting light from the document to an image sensor mounted on the frame.

6. A driving mechanism for a scanning optical system, the driving mechanism housed in a frame having a left side and a right side, the driving mechanism comprising:
   a higher speed optical module movably disposed within the frame;
   a slower speed optical module movably disposed within the frame, wherein the higher speed optical module moves at a faster speed than the slower speed optical module;
   a guide along which the higher speed optical module and the slower speed optical module ride;
   a first driven wheel mounted on the slower speed optical module;
   a second driven wheel mounted on the slower speed optical module, a diameter of the first driven wheel being effectively twice that of the second driven wheel;
   a driving wheel mounted on the higher speed optical module;
   a motor mounted on the higher speed optical module for driving the driving wheel;
   a first idler mounted on the left side of the frame;
   a second idler mounted on the right side of the frame:
   a first conveyer connected to the right side of the frame and to the higher speed optical module, the first conveyer mechanically engaging the second driven wheel and the driving wheel; and
   a second conveyer connected to the left side of the frame and to the higher speed optical module, the second conveyer mechanically engaging the first driven wheel, the first idler and the second idler;

wherein when the motor drives the driving wheel, the first conveyer and the second conveyer cause the higher speed optical module to move at a speed that is effectively twice that of the slower speed optical module.

7. The driving mechanism of claim 6, wherein the first conveyer and the second conveyer are selected from a group consisting of a belt engaging a driving wheel, a toothed belt engaging a toothed driving wheel, a steel wire engaging a driving wheel, and a nylon thread engaging a driving wheel.

8. The driving mechanism of claim 6 wherein the first driven wheel is concentric with the second driven wheel.

9. The driving mechanism of claim 6 further comprising an idler mounted on the higher speed optical module and engaging the first conveyer to increase a surface contact between the first conveyer and the driving wheel.

10. The driving mechanism of claim 6 further comprising:
- a light source disposed in the higher speed optical module;
- a first mirror disposed in the higher speed optical module for reflecting light from the light source to a document; and
- a second mirror in the slower speed optical module for reflecting light from the document to an image sensor mounted on the frame.

11. A driving mechanism for a scanner comprising:
- a frame with left and right sides;
- a guide disposed in the frame from the left side to the right side;
- a higher speed optical module movable along the guide;
- a slower speed optical module movable along the guide;
- a conveyer means for moving the slower speed optical module and the higher speed optical module; and
- a motor mounted on one of either the slower speed optical module or the higher speed optical module, the motor used to drive the conveyer means;

wherein the conveyer means driven by the motor causes the higher speed optical module to move at a speed that is effectively twice that of the slower speed optical module.

* * * * *